H. W. FRIEDEL & H. J. LUTZ.
TRANSMISSION GEARING.
APPLICATION FILED MAY 17, 1912.

1,049,840.

Patented Jan. 7, 1913.

2 SHEETS—SHEET 1.

Witnesses
E. Broker
John J. McCarthy

Inventors
Harry W. Friedel and
Harry J. Lutz.
By Victor J. Evans
Attorney

H. W. FRIEDEL & H. J. LUTZ.
TRANSMISSION GEARING.
APPLICATION FILED MAY 17, 1912.
1,049,840.
Patented Jan. 7, 1913.
2 SHEETS—SHEET 2.
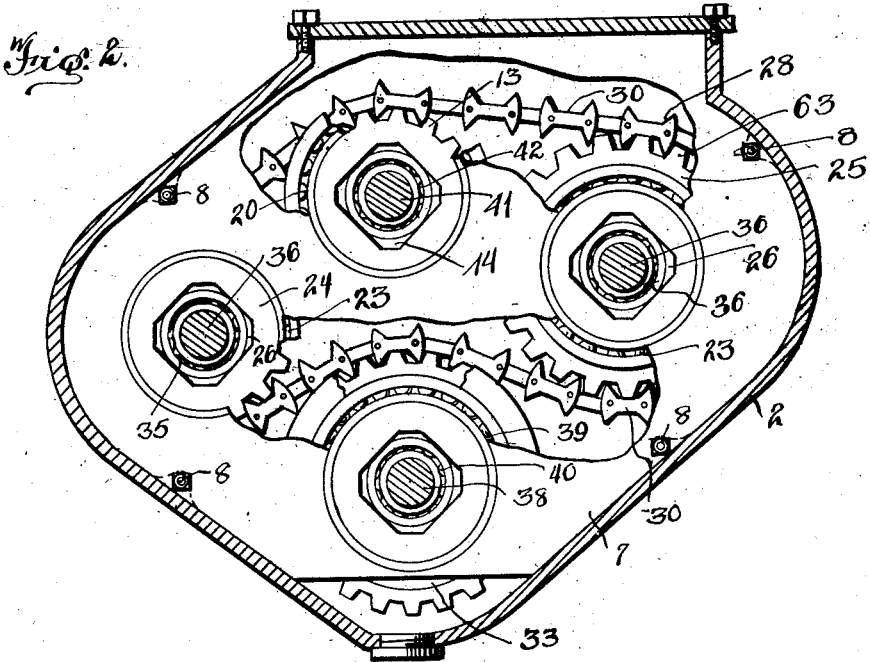
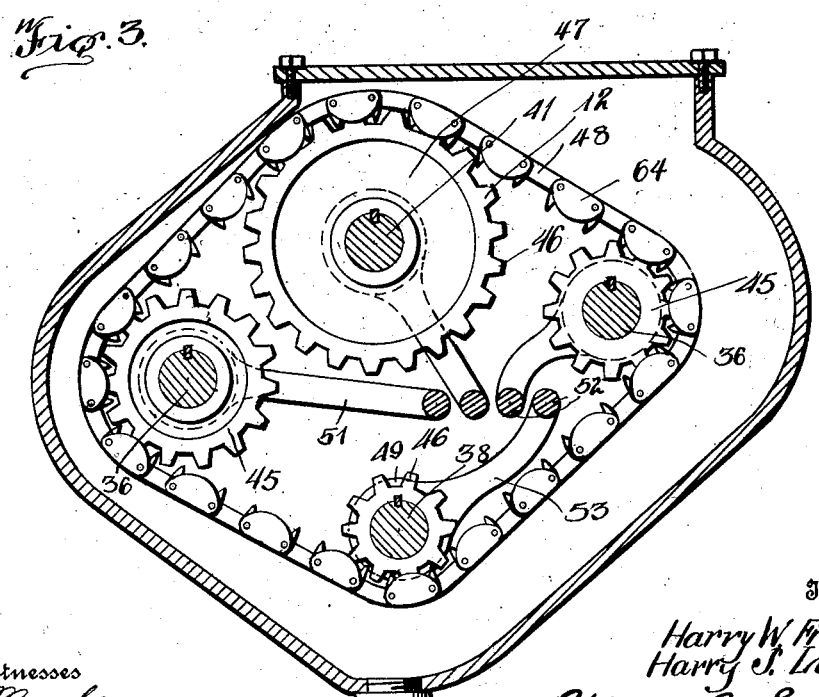
Witnesses
ELCrooker
John J. McCarthy
Inventors
Harry W. Friedel and
Harry J. Lutz.
By Victor J. Evans
Attorney

UNITED STATES PATENT OFFICE.

HARRY W. FRIEDEL AND HARRY J. LUTZ, OF WHEELING, WEST VIRGINIA.

TRANSMISSION-GEARING.

1,049,840.　　　　　Specification of Letters Patent.　　Patented Jan. 7, 1913.

Application filed May 17, 1912. Serial No. 697,940.

*To all whom it may concern:*

Be it known that we, HARRY W. FRIEDEL and HARRY J. LUTZ, citizens of the United States of America, residing at Wheeling, in the county of Ohio and State of West Virginia, have invented new and useful Improvements in Transmission - Gearing, of which the following is a specification.

This invention relates to improvements in transmission gearing and has particular application to variable speed transmission gearing of the selective type.

In carrying out the present invention, it is our purpose to provide a system of gearing of the type above set forth wherein various speeds may be attained without resorting to sliding of the gears, thereby eliminating the objectionable features inherent in sliding gears, such as "stripping" of the gears and the like.

Furthermore, we aim to provide a variable speed transmission gear system wherein various forward speeds and a reverse speed may be attained or brought about without the necessity of sliding the gears.

It is also our purpose to provide a gear system of the character above set forth wherein by means of a power shaft, a driven shaft coaxial with the first shaft and a plurality of jack- or counter-shafts, a direct drive and reverse may be obtained without the necessity of sliding the gears.

The invention has for a still further object the provision of a shifting mechanism for a gear system of this character wherein selected or predetermined gears may be connected in driving engagement without stepping up the speeds.

With the above and other objects in view, the invention consists in the construction, combination and arrangement of parts hereinafter set forth in and falling within the scope of the claims.

Figure 1:
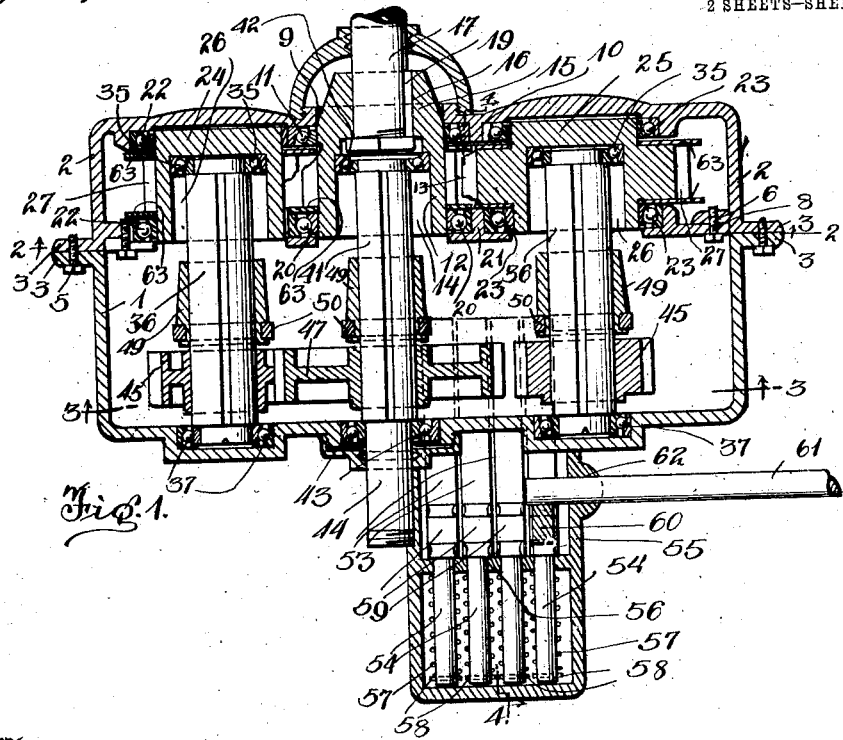
Figure 4:
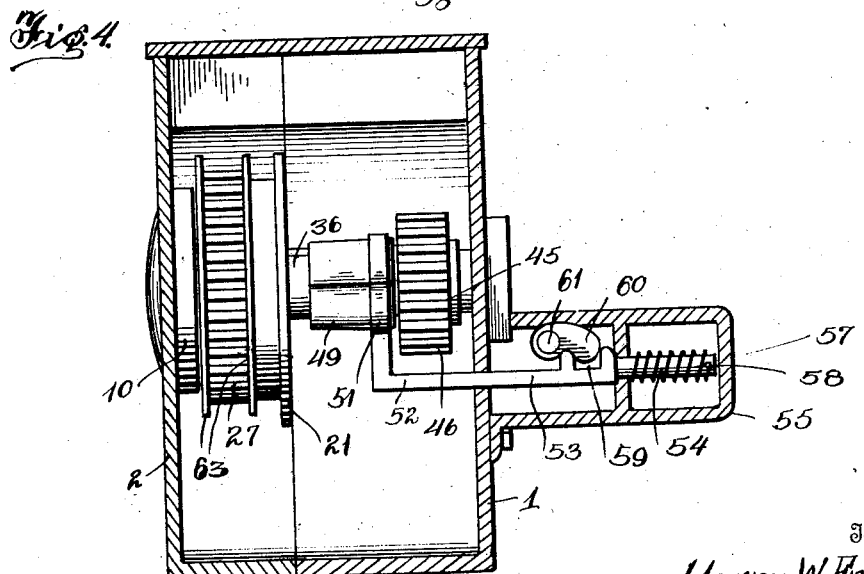

In the accompanying drawings there has been illustrated one preferred and practical embodiment of our invention, and in these drawings: Figure 1 is a horizontal sectional view of a gear system constructed in accordance with the present invention, parts being shown in elevation. Fig. 2 is a vertical sectional view taken on the plane of the line 2—2 of Fig. 1, parts being broken away. Fig. 3 is a similar view taken on the plane of the line 3—3 of Fig. 1. Fig. 4 is a vertical transverse sectional view taken on the plane of the line 4—4 of Fig. 1, and at right angles to Figs. 2 and 3.

Referring now to the accompanying drawings in detail, the casing or housing of the gear mechanism is, in the present instance, composed of two sections 1 and 2, each formed with an outwardly extending flange 3 adapted to abut the flange of the adjacent section, said flanges being provided with alining bolt holes 4 through which are passed the bolts 5 to secure the sections in casing or housing formation. One of the sections, as, for instance, section 2 is equipped interiorly with an inwardly projecting flange 6 formed with bolt holes alining with similar holes in a bearing partition 7, the latter being formed with suitably arranged openings designed to accommodate the positions and receive the bearings of the various shafts of the transmission gear mechanism, bolts 8 or the like being employed to fasten the partition 7 to the flange 6. One wall of the housing, as the wall of the section 2, is formed with an annular opening 9 concentric with which on the interior of the housing is a flange 10 supporting an anti-friction bearing such as the ball bearing 11. Rotatably mounted within the opening 9 and supported upon the anti-friction bearing around such opening, is a driving gear 12 formed interiorly of the housing with teeth 13 and hollowed out as at 14, and provided exteriorly of the casing with an outwardly projecting annular collar 15 formed with a key way 16 and designed to receive one extremity of a power or driving shaft 17, the latter terminating within the hollow portion 14 of the driving gear and having threaded thereon a nut 18 assisting a key 19 located within the key way 16 and a similar way in the proximate portion of the power shaft, to hold the power shaft and driving gear together or connected. The inner extremity of the driving gear 12 is disposed in anti-friction bearings 20 supported in an annular flange 21 arranged concentrically of an opening in the bearing partition 7 and coöperating with the bearing 11 to support the driving gear and enable the latter to rotate with a minimum amount of friction.

Parallel with the driving gear 12 and rotatably supported adjacent thereto within anti-friction bearings 22, 22 and 23, 23 secured to the wall of the housing adjacent the driving gear and the confronting wall of the partition 7, are high and low speed driving gears 24 and 25 respectively each formed with a hollow portion 26 and provided with peripheral teeth 27. The high and low speed driving gears 24 and 25 respectively are designed to be continuously rotated or driven from the driving gear 12 upon the power shaft 17 and, in the present instance, the teeth upon all of said gears are in the nature of sprocket teeth and over all of these gears and in engagement with the teeth thereof, is an endless chain 28 provided with a driving surface 29 designed to drive the gears 12, 24, and 25, and a driving surface 30 at the opposite side of the chain from the surface 29, for a purpose which will presently appear.

Rotatably mounted within anti-friction bearings carried by the wall of the section 2 beneath the driving gear 12 and the confronting surface of the bearing wall 7, respectively, is a reversing gear which, in the present instance, is in the form of a sprocket wheel 33, the reversing gear 33 being at all times in driving engagement with the driving surface 30 of the chain 28. Thus, it will be seen that the gears 24 and 25 will be rotated in like directions from the chain 28 under the action of the driving gear 12, while the reversing gear 33 will, owing to the surface 30 of the chain engaging such gear, rotate in a direction reverse to that of the gears 24 and 25, the reversing gear 33 being hollowed out.

Seated in the hollow portions 26, 26 of the high and low speed gears 24 and 25 respectively, are anti-friction bearings 35, 35, each receiving and supporting one extremity of a jack- or counter-shaft 36, passed through the openings in the bearing partition alining with the hollow portions of the respective gears and having its free extremity journaled or rotatably mounted within anti-friction bearings 37 carried by the opposite wall of the housing, that is the wall of the section 1. Similarly, a reversing shaft 38 has one extremity journaled in anti-friction bearings 39 seated within the hollow portion of the reversing gear 33 and passes through an opening in the bearing partition 7 alining with the hollow portion of such gear and has its opposite or free extremity journaled in anti-friction bearings 40 carried by the wall of the section 1 of the casing and arranged coaxially of or in alinement with the anti-friction bearing within the hollow portion of the reversing gear. Likewise, a driven shaft 41 has one extremity journaled in anti-friction bearings 42 seated within the hollow portion 14 of the driving gear 12, the opposite extremity of such driven shaft passing through the opposite wall of the section 1 and being journaled in anti-friction bearings 43 and terminating exteriorly of the respective wall of the housing or casing, as at 44, the projecting extremity of the driven shaft being adapted to be connected to suitable machinery or the like to drive the same.

Keyed upon the shafts 36, 36, 38 and 41 adjacent to the wall of the section 1 of the housing are driven gears 45, 45, 46 and 47 respectively. These driven gears are always in driving engagement with one another and in the present instance are in the form of sprocket wheels and over such wheels is trained an endless chain 48 designed to transmit motion from the gears 45, 45 and 46 to the gear 47 upon the shaft 41, according to the driving connections between the driven gears 45, 45 and 46 and the driving gear 12, as will hereinafter appear.

As the driven shaft and jack shafts, as well as the reversing shaft have their driving gear extremities loosely encircled by the respective gears, normally, no movement is imparted to such shafts, so that the various driving gears run idle in the movement of the power shaft 17 and under the action of the driving gear 12. However, the low and high speed driving gears as well as the reversing gear are adapted to be placed in and out of driving engagement with the respective shafts and the driven shaft 41 is adapted to be coupled directly with the power shaft to obtain a direct drive. For this purpose, we make use of a gear shifting mechanism which is preferably of the selective type so that any one speed may be obtained without the necessity of stepping up and through the various speeds as is commonly done in variable speed transmission gear systems. This mechanism, in the present instance, consists of what may be termed a key 49 encircling each jack shaft and the driven and reversing shafts. Each key 49 is splined to the respective shaft for sliding movement and is adapted to enter the hollow portion of the respective driving gear of the shaft to couple or connect such gear to the shaft to impart movement to the latter from the former, and consequently rotate the driven shaft 41, the hollow portion of each gear being of non-circular contour in cross section and the particular key being of a contour similar to that of the hollow portion of such gear so as to effectively lock the gears to the shaft. The key 49 upon the shaft 41 is designed to enter the hollow portion 14 of the gear 12 and when in such position interlocks the power shaft with the driven shaft to effect or bring about a direct drive, as will be readily understood.

In order to slide the collars 49 to bring about the various gear ratios or speeds, each key has loosely encircling the same an annular collar 50 of a shifting lever 51, the extremity 52 of each lever terminating in horizontal alinement with the extremities of the other levers, as clearly illustrated in Fig. 3. Connected to the extremity 52 of each shifting lever 51, and projecting outwardly of the transmission gear housing is a shifting rod 53 terminating in an elongated shank 54 and slidably disposed within a housing 55 connected to the gear housing or casing in any suitable manner and provided with a partition 56 through which the shanks 54 of the shifting rods 53 pass. These shifting rods 53 normally hold the keys inactive or in unlocked position, as shown in Fig. 1, a coiled expansion spring 57 encircling each shank 54 for this purpose and having one extremity abutting a pin 58 passed through the end of the shank, while the opposite extremity abuts against the opposite wall of the partition 56. The shifting rods 53 at an appropriate distance from the shanks 54 are provided with alining openings 59 and common to all of said openings is a cam or eccentric 60 carried upon one extremity of an actuating shaft 61 slidably and rotatably mounted within a bore 62 of the casing or housing 55. It will thus be seen that any selected or predetermined driving gear may be locked to the respective shaft to effect the movement of the driven shaft 41.

From the foregoing description taken in connection with the accompanying drawings, the construction, and mode of operation of our improved variable speed transmission gear system will be readily apparent to those skilled in the art.

Let it be assumed that the power or driving shaft 17 is coupled up to a suitable source of power, such, for instance, as an explosive engine and the gear 12 rotated. Under the action of the gear 12, the gears 24 and 25, as well as the reversing gear 33 will rotate and, should it be desired to couple or lock the low speed gear 25 to its jack shaft 36, the actuating rod 61 is slid within the housing 55 and the cam 60 thereon disposed within the opening 59 in the shifting rod 53 to the right of Fig. 1 of the drawings. The shaft 61 is now rotated with the effect to slide the key 49 on the shaft 36 so as to lock the gear 25 to such shaft. In this position of the parts, motion will be transmitted from the gear 12, by way of the gear 25, key 49, shaft 36, gear 45 and gear 47, to the driven shaft 41, from which latter power may be taken for any suitable purpose. Should it now be desired to attain the high speed, the key 49 is moved to an inactive position to disconnect the gear 25 from the shaft 36, while the key on the shaft 36 of the gear 24 is moved to a locking position so as to place the high speed gear in engagement with the respective jack shaft, a relatively high speed being now transmitted from the power shaft to the driven shaft. The direct drive is attained by shifting the key 49 into locking engagement with the gear 12 so as to lock the latter to the shaft 41 thus bringing about or effecting a direct transmission of power from the driving motor, by way of the shafts 17 and 41, to the machinery being driven. On the contrary, should it be desired to reverse the direction of rotation of the shaft 41, the forward speed shaft, if any is being driven, is disconnected from the power or driving shaft, and the key 49 on the reversing shaft 38 is shifted to lock the reversing gear 33 to the reversing shaft whereby the driven shaft will be rotated in a relatively reverse direction, owing to the chain 28 having its surface opposite from that riding over the gears 12, 24 and 25, in engagement with the reversing gear.

In the present instance, the chain 28 is held upon its respective gears by means of guards 63 fastened to the driving and reversing gears, while the chain 48 is maintained in proper position relatively to the respective driven gears by means of flanges or guards 64 carried by the chain.

In the embodiment of the invention selected for illustrative purposes, we have shown our improved variable speed transmission gear system as embodying three variable forward speeds, including "low," "high," and direct drive, and a "reverse." It is to be understood, however, that our invention is not limited to any particular number of speeds either forward or rearward, and while we have herein shown and described one particular embodiment of our invention by way of illustration, we wish it to be understood that we do not confine ourselves to the precise details of construction herein described and delineated, as modification and variation may be made within the scope of the claims and without departing from the spirit of the invention.

We claim:

1. In transmission gearing, a power shaft, a driven shaft, variable speed driving gears adapted to be continuously driven from the power shaft, a jack shaft associated with each driving gear, a driven gear on each jack shaft, a gear on said driven shaft common to all of the last-mentioned gears, driving connections between the last-mentioned gears and the gear on the driven shaft, and means for placing said driving gears in and out of driving engagement with the jack shafts.

2. In transmission gearing, a power shaft, a driven shaft, variable speed driving gears adapted to be continuously driven from the power shaft, a jack shaft associated with each driving gear, a reversing gear adapted to be continuously driven from the power shaft and in a direction reverse to that of the variable speed gears, a driven gear on each jack shaft, a driven gear associated with the reversing gear, a gear on said driven shaft common to all of the last-mentioned driven gears, and means for placing said driving and reversing gears in and out of driving engagement with the driven shaft.

3. In transmission gearing, a power shaft, a driven shaft, variable speed driving gears adapted to be continuously driven from the power shaft, a jack shaft associated with each driving gear, a reversing gear adapted to be continuously driven from the power shaft and in a direction reverse to that of the variable speed gears, a driven gear on each jack shaft, a driven gear associated with the reversing gear, a gear on said driven shaft common to all of the last-mentioned driven gears, and selective gear shifting mechanism for placing said driving and reversing gears in and out of driving engagement with the driven shaft.

4. In transmission gearing, a power shaft, a driven shaft, variable speed driving gears adapted to be continuously driven from the power shaft, a jack shaft associated with each driving gear, a reversing gear adapted to be continuously driven from the power shaft and in a direction reverse to that of the variable speed gears, a driven gear on each jack shaft, a driven gear associated with the reversing gear, a gear on said driven shaft common to all of the last-mentioned driven gears, and selective gear shifting mechanism for placing said driving and reversing gears in and out of driving engagement with the driven shaft, said selective means including shifting rods, connections between the shifting rods and the driven gears, and an actuating rod adapted to actuate said shifting rods.

5. In transmission gearing, a power shaft, a driven shaft, variable speed driving gears adapted to be continuously driven from the power shaft, a jack shaft associated with each driving gear, a reversing gear adapted to be continuously driven from the power shaft and in a direction reverse to that of the variable speed gears, a driven gear on each jack shaft, a driven gear associated with the reversing gear, a gear on said driven shaft common to all of the last-mentioned driven gears, and selective gear shifting mechanism for placing said driving and reversing gears in and out of driving engagement with the driven shaft, said selective means including shifting rods, connections between the shifting rods and the driven gears, and an actuating rod adapted to be shifted longitudinally and rotated to select a particular driving gear and place such gear in engagement with the respective shaft.

6. In variable speed transmission gearing, a power shaft, a driven shaft, variable speed sprocket wheels, an endless chain connecting said sprocket wheels to the power shaft for continuously driving said wheels from the shaft, a jack shaft associated with each sprocket wheel, a driven sprocket on each jack shaft, a sprocket wheel on said driven shaft, an endless chain connecting the last-named sprocket wheel to the driven sprocket wheels on the jack shafts, and means for placing said driving sprocket wheels in and out of driving engagement with the jack shafts.

7. In variable speed transmission gearing, a power shaft, a driven shaft coaxial with said power shaft, jack shafts parallel with the first-mentioned shafts, a sprocket wheel keyed to the power shaft, similar wheels loosely encircling the jack shafts, an endless driving chain connecting all of said wheels, a second sprocket wheel on each of said jack shafts, a similar wheel on said driven shaft, an endless chain trained over all of said last wheels, sliding keys encircling the jack shafts and adapted to place the respective first-mentioned sprocket wheels in and out of driving engagement with said shafts, a reversing shaft, a sprocket wheel loose on one end of said reversing shaft and in driving engagement with said first chain, a second sprocket wheel keyed to the said reversing shaft and having reverse driving connection with the last-mentioned chain, and means for placing the loose sprockets in and out of driving engagement with the respective shafts.

8. In variable speed transmission gearing, a power shaft, a driven shaft coaxial with said power shaft, jack shafts parallel with the first-mentioned shafts, a sprocket wheel keyed to the power shaft, similar wheels loosely encircling the jack shafts, an endless chain connecting all of said wheels, a second sprocket wheel on each of said jack shafts, a similar wheel on said driven shaft, an endless chain trained over all of said wheels, sliding keys encircling the jack shafts and adapted to place the respective first-mentioned sprocket wheels in and out of driving engagement with said shafts, a reversing shaft, a sprocket wheel loose on one end of said reversing shaft and in driving engagement with said first chain, a second sprocket wheel keyed to the said reversing shaft and having reverse driving connection with the last-mentioned chain, means for placing the loose sprockets in and out of driving engagement with the respective shafts, and means for connecting the driven shaft directly to the power shaft.

In testimony whereof we affix our signatures in presence of two witnesses.

HARRY W. FRIEDEL.
HARRY J. LUTZ.

Witnesses:
ROBERT W. KYLE,
JNO. T. MONAHAN.